May 13, 1924.
M. J. RITTERRATH
MIRROR
Original Filed July 3, 1920
1,494,134
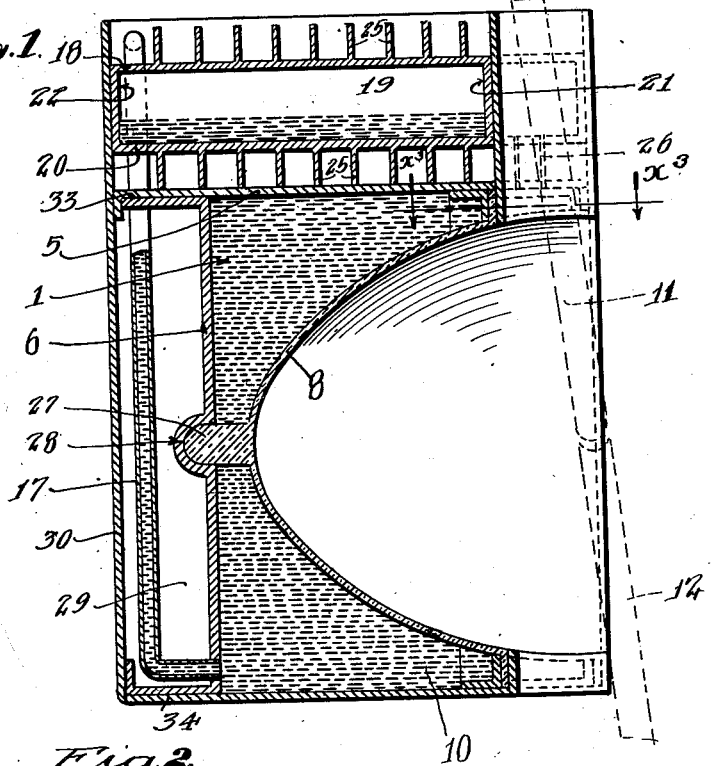
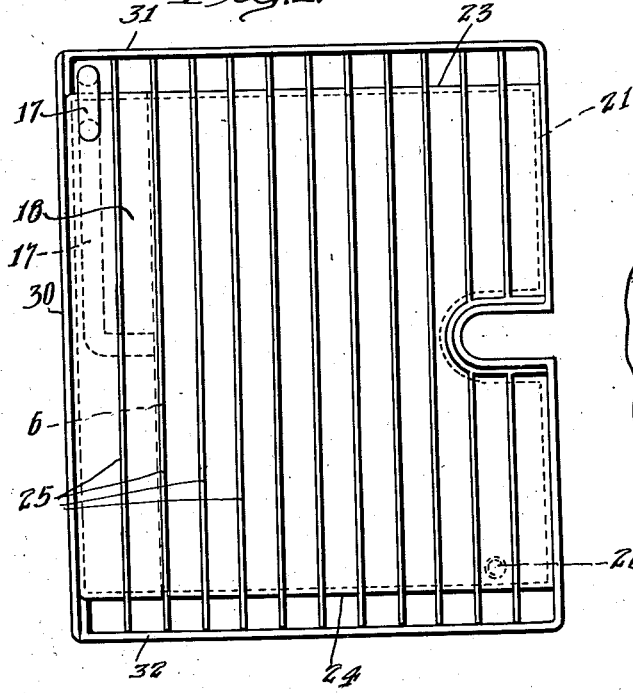
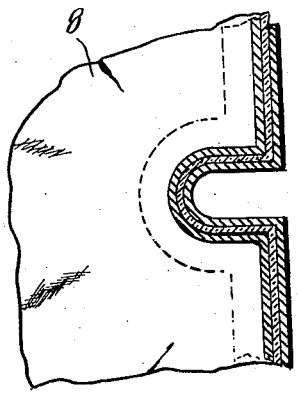
INVENTOR.
Max J. Ritterrath
BY
ATTORNEY Patented May 13, 1924.

1,494,134

UNITED STATES PATENT OFFICE.

MAX J. RITTERRATH, OF HOLLYWOOD, CALIFORNIA.

MIRROR.

Application filed July 3, 1920, Serial No. 393,842. Renewed October 11, 1923.

*To all whom it may concern:*

Be it known that I, MAX J. RITTERRATH, a citizen of the United States, residing at Hollywood, Los Angeles, in the county of Los Angeles and State of California, have invented a new and useful Mirror, of which the following is a specification.

This invention relates to mirrors of the type capable of being used in connection with relatively intense sources of light, for example the arc light, and an object of the invention is to effect cooling of the mirror.

Another object is to make provision for circulating the cooling medium of the mirror.

Another object is to construct the mirror in one form of the invention so that the cooling medium will also function as a reflecting medium to reflect the light rays.

In moving picture projectors, because of the intense heat of the arc, it is customary to employ the arc without a mirror and thus much of the light furnished by the arc is dissipated and lost. Besides this, the usual construction of motion picture projectors is such that the light rays are highly concentrated in the plane occupied by the film, and to still further concentrate them would make more liable burning up of the film if it should be stopped for a slightly longer interval of time than is usually required in the projection thereof. Thus with the ordinary arrangement of lenses in the projectors it is not desirable to employ a reflector. This mirror is especially useful as an element of the apparatus for projecting the images on motion picture films disclosed in my copending application, Serial No. 387,557, filed June 9, 1920, since in said application the combination of lenses and the method of cooling or interrupting the radiant heat produced by the light source permits of the use of a mirror. In fact, in the apparatus which is the subject of said copending application, it is highly desirable to employ a mirror, but the ordinary mirror could not be used because of distortion thereof which the intense heat would cause.

This mirror may be used wherever the source of light is of such great intensity as would cause relatively great expansion of the mirror or, as often happens, breakage thereof if the mirror were of the ordinary character. Even though the mirror is not broken by the intense heat, it is clear that in projection work, where it is so important that the light rays be accurately projected, distortion of the mirror by heat from the light source will cause the rays to be inaccurately projected. Thus, an object of this invention is to avoid distortion of the mirror.

The accompanying drawings illustrate the invention:

Fig. 1 is a vertical mid section of one form of mirror embodying the invention.

Fig. 2 is a plan view of Fig. 1.

Fig. 3 is a fragmental plan section on line indicated by $x^3$—$x^3$, Fig. 1.

There is provided a chamber indicated at 1 and formed, in this instance, by side walls 23, 24 bottom 4, top 5, rear wall 6, and front wall. In the drawings the greater portion of the wall 8 is of parabolic conformation, but it is understood that it may be made of any other suitable externally concave shape.

In the form of the invention shown in Figs. 1 to 3, the front wall 8 is formed of a light-transmitting substance such as glass so that light rays can be transmitted thereby to the rear surface of said front wall.

The chamber 1 is supplied with a cooling medium indicated as a liquid 10 which, in this instance, is a reflector of light rays. The cooling medium in Fig. 5 may be, for example, mercury. The surface of the mercury adjacent the light transmitting wall 8 forms a reflector or mirror surface adapted to reflect light rays transmitted through the wall 8.

Electrodes are indicated in dotted lines at 11, 12 as indicating a source of light, but they are not a part of the invention.

Not only is circulation of the cooling medium provided for, but expansion thereof is also provided for and the construction for permitting this is as follows: Passing through the rear wall 6 and communicating with the lower portion of the chamber 1 is a tube 17, and the upper end of said tube passes through the top 18 of an expansion chamber or reservoir 19. The bottom of the chamber 19 is indicated at 20, the front wall at 21, the rear wall at 22, and the side walls at 23, 24. The top 18 and bottom 20 are preferably provided with heat transmitting and radiating fins 25, but it is understood that said fins may be omitted if it is not desired to employ them. Passing through the bottom 20 of the chamber 19 is a tube 26 which is connected at its lower end with the top 5 of the chamber 1, thus affording communication between the chambers 1, 19.

In Fig. 1 as the cooling medium becomes heated from the heat produced by the light source, it expands, and the chamber 19, not being full when the mirror is cool, permits the mercury to expand into said chamber. It may be that the heat will even be sufficient to vaporize the mercury and, in that event, the mercury will expand and flow through the tube 26 into the chamber 19 where it will vaporize and then cool and condense. From the chamber 19 the liquid mercury will pass downwardly through the tube 17 to the lower portion of the chamber 1.

The front wall 8 is provided with a rearwardly projecting stud 27 engaging a recess 28 formed in the rear wall 6.

The tube 17 is partially accommodated in a chamber 29 formed rearwardly of the chamber 1, the front wall of the chamber 29 being the wall 6, the rear wall being indicated at 30, the side walls at 31, 32, the top at 33 and the bottom at 34. The walls 23, 24 extend upwardly at the sides of the chamber 19 from the bottom 34 and are spaced from the side walls 31, 32 of said chamber and the upper portion of the tube 17 passes through the space between the wall 31 and wall 23 as clearly shown in Fig. 2.

I claim:

1. A mirror comprising means forming a chamber, the front wall of the chamber being of light-transmitting material, a liquid light-reflecting medium in the chamber in contact with the light-transmitting wall and forming the reflecting surface of the mirror, and means to circulate and cool the light-reflecting medium.

2. A mirror comprising means forming a chamber, the front wall of the chamber being of light-transmitting material, a body of mercury in the chamber in contact with the light-transmitting wall and forming the reflecting surface of the mirror, and means to circulate and cool the mercury.

3. A mirror comprising means forming a chamber, the front wall of the chamber being of light-transmitting material, a liquid light-reflecting medium in the chamber in contact with the light-transmitting wall and forming the reflecting surface of the mirror, and means forming a cooling chamber connected with the upper and lower portions of the first-named chamber.

4. A mirror comprising means forming a chamber, the front wall of the chamber being of light-transmitting material, a liquid light-reflecting medium in the chamber in contact with the light-transmitting wall and forming the reflecting surface of the mirror, and means forming a vapor condensing chamber connected with the upper and lower portions of the first named chamber and provided with heat-radiating fins.

Signed at Los Angeles, California, this 28th day of June 1920.

MAX J. RITTERRATH.

Witnesses:
GEORGE H. HILES,
L. BELLE WEAVER.